Nov. 9, 1948.   D. J. WHITTINGHAM   2,453,391
TUBING CONNECTION
Filed Jan. 14, 1946
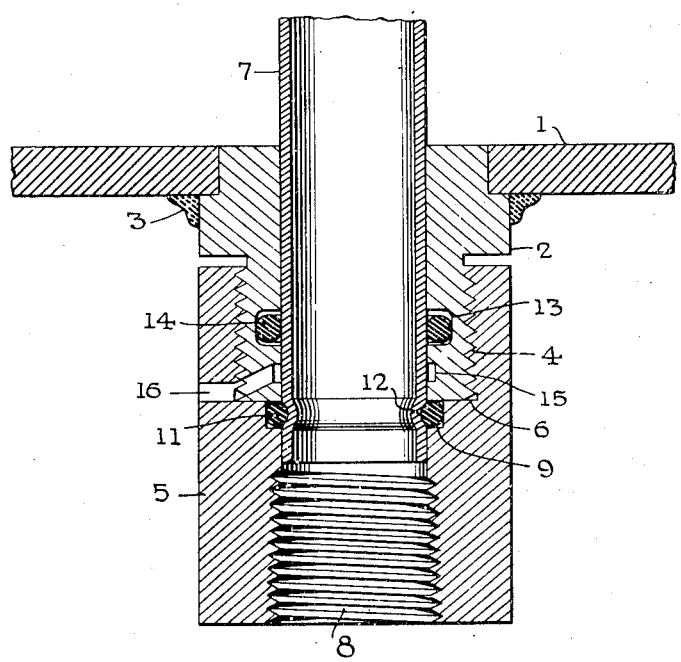
Inventor
David J. Whittingham
By
Attorneys Patented Nov. 9, 1948

2,453,391

UNITED STATES PATENT OFFICE 2,453,391

TUBING CONNECTION

David J. Whittingham, Watertown, N. Y., assignor to The New York Air Brake Company, a corporation of New Jersey Application January 14, 1946, Serial No. 641,073

4 Claims. (Cl. 285—30)

This invention relates to readily separable connectors for tubes. A feature of the invention is that it provides two spaced seals and provides means to collect and drain away fluid passing either seal. In certain cases this is useful because it prevents mingling of two diverse fluids separated by the seal.

As an example of such a case, hydraulic oil reservoirs sometimes require a cooling coil through which cooling water is circulated. It is important that no water enter the hydraulic system, and that no oil enter the cooling water circuit. The invention accomplishes that purpose and also provides a simple connection that will withstand considerable hydrostatic pressure without pulling apart or leaking.

The invention will now be described as used to connect one end of a cooling coil to a water supply fitting, which fitting is attached to a hydraulic reservoir.

In the drawing the single figure is an axial section through the fitting and shows it connected to the reservoir.

The bottom of the reservoir shown at 1 has an aperture in which is mounted the portion 2 of a two part body. This is welded in place as shown at 3. The lower end of portion 2 is reduced in diameter and threaded at 4 to receive the lower portion 5 of the body. The parts 2 and 5 seat on shoulder 6, which in effect is the plane of separation of the parts.

The upper and lower portions 2 and 5 have an axial bore (i. e. a bore approximately normal to the plane of separation) in which bore tube 7 makes a free fit. Tube 7 is one end of the cooling coil. The lower end of the bore is pipe threaded as shown at 8, the threads being intended to connect the water pipe (not shown) to the portion 5.

Above the pipe threads 8 and at the shoulder 6, a groove 9 encircles the bore. This groove is rectangular in cross-section, and confines a packing ring 11 composed of resilient rubber-like material. This ring is a torus when unstressed and projects into a rather shallow rounded annular groove 12 which encircles tube 7. The groove 12 may be formed in various ways, but as shown is produced by rolling the tube wall inward.

The ring 11 is mounted under radial compression and thus serves to seal the joint against the escape of water and also as means to lock tube 7 against motion in the direction of its length. Since the two portions of the fitting separate at the groove 9, connection of the parts may be effected quite simply particularly since the ring does not fill the groove.

A second internal packing groove 13 encircles the bore in portion 2 and receives a second resilient rubber-like ring 14 also of toric form and mounted under radial compression. Ring 14 seals against flow of oil from the reservoir along the exterior of tube 7, but does not quite fill groove 13.

While leakage will not ordinarily occur, a leakage collecting groove 15 is provided. This encircles the bore between grooves 9 and 13, and has a drain port 16 through which any oil or water leakage is drained to the exterior of the fitting.

While a preferred arrangement has been described, modifications are possible. The groove which receives the ring 11 (which performs a locking function) should be at the plane of separation of portions 2 and 5, so that separation of the two portions will facilitate insertion of the ring. The plane of separation need not be at the top of the groove as shown. The parts 2 and 5 need not be screw-threaded together, any suitable type of connection affording a plane of separation at the groove 9 could be substituted.

The construction shown is therefore merely illustrative of the invention.

What is claimed is:

1. A tube connection comprising a body having a bore and two internal spaced grooves encircling said bore and opening thereunto, a tube inserted into said bore substantially filling the bore, extending past both grooves and having an encircling groove opposed to one of the grooves in the body; and two packing rings of resilient rubber-like material confined in respective grooves in the body, one of said rings entering the encircling groove in the tube to retain the tube in said bore, said rings and grooves being relatively so dimensioned that when the parts are assembled, the rings are deformed in radial compression between the tube and body but do not completely fill the grooves.

2. A tube connection comprising a body formed in two parts, and having a bore approximately normal to the plane of separation of said parts, said body having two spaced bore-encircling internal grooves one of which grooves is located at said plane of separation; a tube inserted into said bore substantially filling the bore, extending past both grooves and having an encircling groove opposed to the groove located at the plane of separation; and two packing rings of resilient rubber-like material, each confined in radial compression between the tube and the body in respective grooves in the body, at least that ring which is in the groove not at the plane of separation being dimensioned so as not to fill its groove.

3. A tube connection comprising a body having a bore and two spaced internal grooves encircling said bore and opening thereunto, a tube inserted into said bore substantially filling the bore, extending past both grooves and having an encircling groove opposed to one of the grooves in the body; and two packing rings of resilient rubber-like material confined in respective grooves in the body, one of said rings entering the encircling groove in the tube to retain the tube in said bore, said rings and grooves being relatively so dimensioned that when the parts are assembled, the rings are deformed in radial compression between the tube and the body but do not completely fill the grooves, and said body having a third internal encircling groove located between the aforesaid grooves and a port leading from said groove to the exterior of said body.

4. A tube connection comprising a body formed in two parts, and having a bore approximately normal to the plane of separation of said parts, said body having two spaced bore-encircling internal grooves one of which grooves is located at said plane of separation; a tube inserted into said bore substantially filling the bore, extending past both grooves and having an encircling groove opposed to the groove located at the plane of separation; and two packing rings of resilient rubber-like material, each confined in radial compression between the tube and the body in respective grooves in the body, at least that ring which is in the groove not at the plane of separation being dimensioned so as not to fill its groove, and said body having a third internal encircling groove located between the aforesaid grooves, and a port leading from said groove to the exterior of said body.

DAVID J. WHITTINGHAM.

REFERENCES CITED

The following references are of record in the file of this patent:

UNITED STATES PATENTS

| Number | Name | Date |
| --- | --- | --- |
| 626,447 | Strater | June 6, 1899 |
| 2,115,383 | Christensen | Apr. 26, 1938 |
| 2,320,589 | Gruetgen | June 1, 1943 |